United States Patent
Brown et al.

(10) Patent No.: US 8,621,242 B2
(45) Date of Patent: Dec. 31, 2013

(54) DISPLAY OF A VERIFICATION IMAGE TO CONFIRM SECURITY

(75) Inventors: Robert Brown, Berkshire (GB); Donald Felton, Cambridgeshire (GB); James Ian McNiven, Cambridgeshire (GB)

(73) Assignee: ARM Limited, Cambridge (GB)

( * ) Notice: Subject to any disclaimer, the term of this patent is extended or adjusted under 35 U.S.C. 154(b) by 6 days.

(21) Appl. No.: 12/923,935

(22) Filed: Oct. 14, 2010

(65) Prior Publication Data

US 2011/0093723 A1   Apr. 21, 2011

Related U.S. Application Data

(63) Continuation-in-part of application No. 11/141,689, filed on Jun. 1, 2005.

(30) Foreign Application Priority Data

Jun. 11, 2004   (EP) .................................... 04253503

(51) Int. Cl.
  *G06F 12/14*   (2006.01)
(52) U.S. Cl.
  USPC ........................................................ 713/193
(58) Field of Classification Search
  USPC ........................................................ 713/193
  See application file for complete search history.

(56) References Cited

U.S. PATENT DOCUMENTS

| | | | |
|---|---|---|---|
| 6,209,104 B1 | 3/2001 | Jalili | |
| 7,302,585 B1* | 11/2007 | Proudler et al. | 713/189 |
| 2003/0076336 A1* | 4/2003 | Fukao et al. | 345/589 |
| 2003/0120957 A1* | 6/2003 | Pathiyal | 713/202 |
| 2003/0159042 A1* | 8/2003 | Steinberg | 713/172 |
| 2005/0166044 A1 | 7/2005 | Kanai et al. | |
| 2005/0166057 A1 | 7/2005 | Kanai et al. | |
| 2005/0268095 A1* | 12/2005 | O'Connor | 713/167 |
| 2006/0069926 A1* | 3/2006 | Ginter et al. | 713/194 |
| 2006/0090084 A1* | 4/2006 | Buer | 713/189 |
| 2006/0195907 A1* | 8/2006 | Delfs et al. | 726/26 |
| 2006/0223637 A1* | 10/2006 | Rosenberg | 463/47 |
| 2007/0044146 A1 | 2/2007 | Murase et al. | |
| 2007/0234069 A1* | 10/2007 | Ginter et al. | 713/189 |
| 2008/0005794 A1* | 1/2008 | Inoue et al. | 726/22 |

FOREIGN PATENT DOCUMENTS

| | | |
|---|---|---|
| EP | 1 056 014 | 11/2000 |
| WO | 02/31631 | 4/2002 |

* cited by examiner

*Primary Examiner* — Kambiz Zand
*Assistant Examiner* — Teshome Hailu
(74) *Attorney, Agent, or Firm* — Nixon & Vanderhye P.C.

(57) ABSTRACT

A handheld device 300 generates a verification image to indicate that the device is operating in a secure domain. The verification image is generated in dependence upon secure data stored within a secure region 324 of a memory 310 and user input data captured from a user input device 314, 316, 320. The secure data may be data defining a three-dimensional object. The user image data may be captured from accelerometers 314 defining a viewpoint of the secret three-dimensional object.

19 Claims, 9 Drawing Sheets

DISPLAY OF A VERIFICATION IMAGE TO CONFIRM SECURITY

This application is a continuation in part of U.S. application Ser. No. 11/141,689 filed on 1 Jun. 2005, which claims priority to EP Application No. 04253503.9 filed 11 Jun. 2004, the entire contents of which are incorporated herein by reference.

BACKGROUND OF THE INVENTION

1. Field of the Invention

This invention relates to the field of data processing systems. More particularly, this invention relates to the verification of the secure operation of data processing systems.

2. Description of the Prior Art

It is known to provide data processing systems with both a secure domain of operation and a non-secure domain of operation. In the secure domain of operation the data processing system is able to access secure within a memory which is non-accessible when the data processing system is operating in the non-secure domain. The secure data may, for example, be bank data, cryptographic keys, personal information or the like. In order to enhance the security of operation of such devices it is useful to be able to demonstrate to the user that the device is operating in a secure mode.

It is known for a device to display an indication on a display screen to indicate that a secure mode of operation or communication is currently being used. As an example, browser software may display a symbol indicating that a secure web browsing session is taking place and the user can check for this indication before inputting secret information, such as a personal identification number (PIN), credit card details or the like.

A problem with this approach is that it is possible to fake the display of the symbol indicating that the system is operating securely, i.e. in a secure domain. A malicious programmer who is able to mislead a user into believing that their device is operating in the secure domain by displaying a fake version of the indication associated with the secure domain may then inappropriately gain access to secret information.

SUMMARY OF THE INVENTION

Viewed from one aspect the present invention provides a data processing apparatus comprising:

processing circuitry configured to operate in a selectable one of a secure domain and a non-secure domain;

a memory coupled to said processing circuitry and configured to store secure data, said secure data being accessible to said processing circuitry when operating in said secure domain and being non-accessible to said processing circuitry when operating in said non-secure domain;

a user input device coupled to said processing circuitry and configured to receive user input data; and a display coupled to said processing circuitry and configured to display an image generated by said processing circuitry; wherein said processing circuitry is configured to operate in said secure domain to read said secure data from said memory and said user input data from said user input device and to generate a verification image dependent upon both said secure data and said user input data;

before said processing circuitry operates in said secure domain to generate said verification image, said user input device is configured such that said user input data cannot be read when said processing circuitry is operating in said non-secure domain; and said display is configured to display said verification image to a user to indicate that said processing circuitry is operating in said secure domain.

The present technique enhances security by generating a verification image which is dependent both upon secure data readable only in the secure domain as well as on user input data captured by a user input device which is non-accessible in the non-secure domain. Thus, a malicious programmer seeking to display a fake verification image will have to obtain the secure data and the user input data, but this will be made more difficult since that secured data is not directly presented as it is instead combined with the user input data from the secure domain to generate a verification image. Thus, if the malicious person is able to observe or capture the verification image generated during one use of the apparatus, this will not reveal the secure data itself as the verification image is dependent on both the secure data and the user input data.

It will be appreciated that in some embodiments the operating system of a hypervisor may dynamically switch the processing circuitry back and forth between the secure domain and the non-secure domain to support multithreaded operation. Thus, the processing in the secure domain may be mixed with periods when the processing circuitry is operating in the non-secure domain. The secure data will remain non-accessible during these periods of operation in the non-secure domain.

It will be appreciated that the way in which the verification image depends upon the secure data and the user input data can take a wide variety of different forms. The secure data may be, for example, a secure image, a secure transform and/or a secure offset to a transform. In one example form, the secure data is secure image data and the processing circuitry applies a secure transformation (i.e. a transform the form of which is non-accessible) when operating in the non-secure domain) depending upon the user input data to the secure image data to generate the verification image. Thus, the verification image is a transformed version of the secure image data and even if the verification image is observed this will not reveal what form the verification image should take on another use when the user may generate different user input data giving rise to a different transformation to the secure image data.

As an example, on one occasion a user may provide user input data which specifies that the image should be stretched horizontally whilst on a another occasion the user may provide user input adapt which specifies that the image should be stretched vertically. If the user observes a horizontally stretched image when they specified that it should be stretched vertically, then they will know that the verification image is not authentic.

The secure image data may be simple two-dimensional image data. However, in some embodiments the secure image data may define a three-dimensional object and the user input data may define a viewpoint (orientation and distance) such that the processing circuitry generates the verification image to correspond to the three-dimensional object viewed from the view point specified. The display may be a stereoscopic display presenting a 3D image. At each time the user wishes to authenticate secure domain operation the secure image data may be viewed from a different viewpoint to generate a verification image which will vary markedly dependent upon the viewpoint chosen and enable the user to identify whether the verification image is authentically generated from the secure data in response to the viewpoint they have specified or is a non-authentic image based upon, for example, a previously illicitly captured verification image.

The verification image may be generated by a three-dimensional graphics accelerator provided within the data processing apparatus. Such a graphics accelerator may be configured to operate in the secure domain (i.e. as a secure device having access to the secure data), so as to generate the verification image and store the verification image within a region of memory that is non-accessible when operating in the non-secure domain. Thus, the three-dimensional graphics accelerator may operate as a secure device generating a verification image which is stored in a secure area of memory which serves as a secure frame buffer.

It may be that the verification image is a simple static image generated in dependence upon the user input data provided as authentication of secure operation is required. However, security is further enhanced when the processing circuitry generates a sequence of verification images which vary in dependence upon the user input data, such as the verification image being a moving image. This makes it harder for a malicious person to capture a sequence of previously generated verification images and display these as there is greater difficulty in matching varying user input data generating a sequence of verification images.

As an example, the user input device may comprise accelerometer circuitry with the user input data indicating the orientation of the apparatus and this user input data defining a time-varying viewpoint of a three-dimensional object defined by secure data stored within the memory. The orientation may be subject to some static offset that is itself part of a secure transaction. The real time input of the user input data varying the viewpoint and thus the verification image displayed will produce a sequence of verification images that will vary each time the user seeks to authenticate secure operation as the user input data is highly likely to vary between these occasions.

Another example of secure data and user input data utilising the present techniques is when the device includes a key stroke entry device and the secure data is secure transform data. In this circumstance, the user input data may be key stroke data and the secure transform data specifies a transform to be performed upon the key stroke data to generate verification characters for display as the verification image. The key strokes may be a simple numeric sequence of numbers and the secure transform adapted may specify a particular transform to be performed upon those numbers with this transform only being known by the user.

For example, the first number could always be doubled, the second number could be reduced by a value of two, the third number could be squared and the fourth number could be unaltered. Each time the user inputted their key strokes they would known which numbers they were expecting to be displayed in accordance with the secure transform they had previously configured, even though the verification image would vary each time.

The verification image may be read from a portion of a memory that cannot be written when the processing circuitry is operating in the non-secure domain. Thus, only programs operating in the secure domain will have been able to write the verification image to the portion of the memory from which it is to be read.

Another example embodiment of the techniques may use a camera configured to capture image data as the user input device. The secure data may indicate a transform to be applied to the captured image data in order to generate a verification image. Thus, a user seeking to verify a secure operation may capture image data that was present in their current surroundings and utilise secure data to apply a transform to that captured image data to generate a verification image unique to the verification session concerned.

In some embodiments the user input device may be integrally formed with the processing circuitry, the memory and the display. These devices may be hand held devices.

The generation of the verification image to indicate to the user that the device is operating in the secure domain may be followed by the device still operating in the secure domain receiving a user password indicating authentication of an action.

The verification image may include an action portion which indicates the action to be authenticated by the subsequent entry of the user password. Such an action may for example be the value of a purchase which is to be authenticated when the user is satisfied with the display of the verification image by the user inputting their user password.

Viewed from another aspect the invention provides a data processing apparatus comprising:

processing means for operating in a selectable one of a secure domain and a non-secure domain;

memory means for storing secure data and coupled to said processing means, said secure data being accessible to said processing means when operating in said secure domain and being non-accessible to said processing means when operating in said non-secure domain;

user input means for receiving user input data device and coupled to said processing means; and display means for display an image generated by said processing circuitry; wherein said processing means is configured to operate in said secure domain to read said secure data from said memory means and said user input data from said user input means and to generate a verification image dependent upon both said secure data and said user input data;

before said processing means operates in said secure domain to generate said verification image, said user input means is configured such that said user input data cannot be read when said processing circuitry is operating in said non-secure domain; and said display means is configured to display said verification image to a user to indicate that said processing means is operating in said secure domain.

Viewed from a further aspect the invention provides a method of verifying security, said method comprising the steps of:

operating processing circuitry in a selectable one of a secure domain and a non-secure domain;

storing secure data, said secure data being accessible to said processing circuitry when operating in said secure domain and being non-accessible to said processing circuitry when operating in said non-secure domain;

receiving user input data;

when said processing circuitry is operating in said secure domain, reading said secure data and generating a verification image dependent upon both said secure data and said user input data;

before said processing circuitry operates in said secure domain to generate said verification image, said user input data is made non-readable when said processing circuitry is operating in said non-secure domain; and displaying said verification image to a user to indicate that said processing circuitry is operating in said secure domain.

The above, and other objects, features and advantages of this invention will be apparent from the following detailed

DESCRIPTION OF EMBODIMENTS

Figure 1:
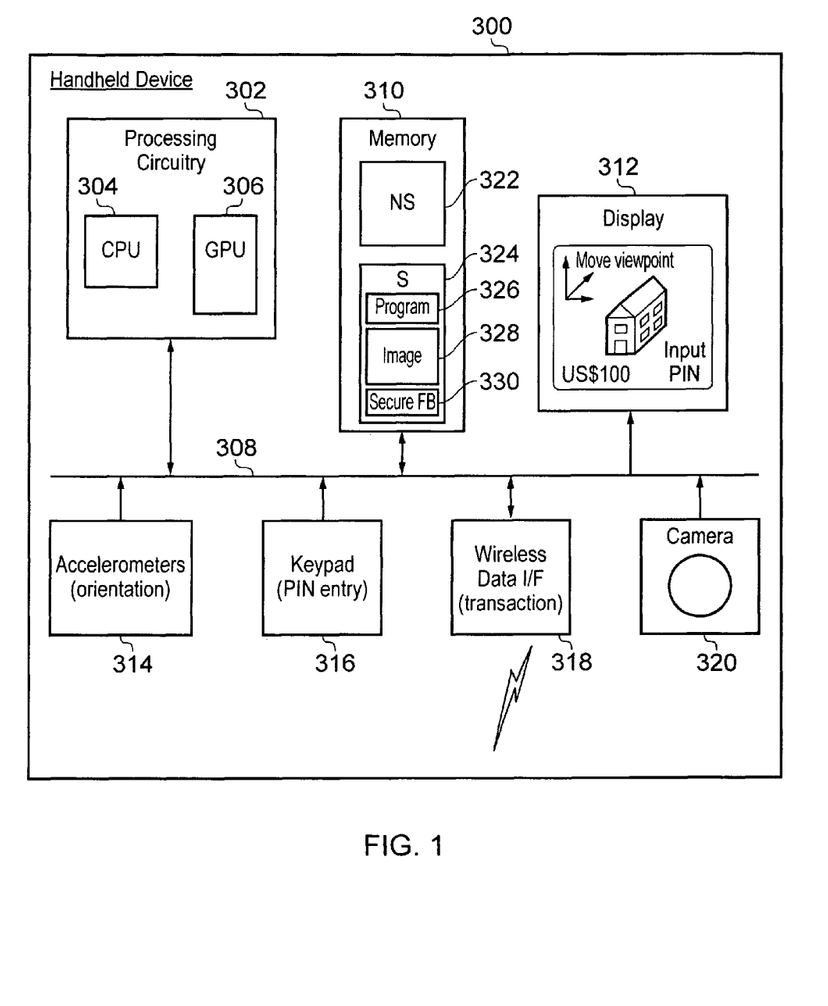
FIG. 1 schematically illustrates a handheld device displaying a verification image based upon secure data and user input data.

FIG. 1 schematically illustrates a data processing apparatus in the form of a handheld device 300. The handheld device includes processing circuitry 302 incorporating a general purpose processing core 304 and a graphics processing unit 306. The processing circuitry 302 is connected to a system bus 308 and communicates via this system bus with a memory 310, a display 312, accelerometers 314, a keypad 316, a wireless data interface 318 and a camera 320. It will be appreciated that the handheld device 300 may contain many further circuits but these have been omitted from FIG. 1 for the sake of clarity.

The memory 310 contains a non-secure region 322 and a secure region 324. The processing circuitry 320 may operate in either a secure domain or a non-secure domain in accordance, for example, with the TrustZone architecture designed by ARM Limited of Cambridge, England. When operating in the non-secure domain, the processing circuitry 302 may access the non-secure region of memory 322 but may not access the secure region of memory 324. When the processing circuitry 302 is operating in the secure domain, it is able to access both the non-secure region of memory 322 and the secure region of memory 324. Accordingly, the secure region of memory 324 may be used to store secure data, such as cryptographic keys, personal information, security sensitive programs and the like.

In this example embodiment, the secure region 324 stores secure program data 326, secure image data 328 and a secure frame buffer 330. The secure program 326 is used to control the generation of the verification image based upon secure data stored within the secure region 324 as well as user input data received from one or more accelerometers 314, the keypad 316 and the camera 320. The display 312 displays the verification image generated in dependence upon the secure data and the user input data. This verification image may be a static image or a moving image in the form of a video. The manner in which the verification is independent upon the user input data may vary. Various possibilities will be described below.

In the example verification image illustrated in FIG. 1, the verification image is associated with a user inputting their personal identification number (PIN) to authenticate a purchase. It is desirable for the user to ensure that the handheld device 300 is properly operating in the secure domain before they enter their PIN. The display of the verification image permits the user to be more confident that the handheld device 300 is properly in the secure domain. The verification image can vary dependent upon the user input data captured at the particular time that the verification image is being generated. One example of the verification image is a secret three dimensional object displayed from a viewpoint dependent upon the orientation in which the handheld device is held (as sensed by the accelerometers 314). The verification image can vary in real time as the user moves the handheld device 300 into different orientations such that the view-point of the secret three dimensional object will change. The proper behaviour of the verification image generated in this way is difficult for a malicious person to convincingly fake as even if they have captured a previous sequence of verification images generated these are unlikely to be the same as the verification images which are needed to be generated to represent the changes in viewpoint commanded by the user in the present instance of the generation of the verification image.

Another example the secret data may be a numeric transform applied to character data input via the key pad 316. The transform may vary for each digit entered. The user input data may be a four digit number. The secure data may be a numeric transform applied to this for digit number with this numeric transform being known only to the user. This numeric transform could take a wide variety of different forms. For example, the first and the third numbers input may be incremented by one and the second and fourth numbers might be decremented by one. As the digits entered as user input data on each occurrence will vary, a previously observed verification image will not allow a malicious user to be certain of generating the correct verification image for the new numbers entered.

Also illustrated in FIG. 1 are that the verification image includes an action portion indicating that the action being requested subject to the user being satisfied that the verification image is probably indicating that the handheld device is operating in the secure domain is the input of a PIN to authorise a transaction of a particular value. This is useful as a user may take more care in ensuring that the verification image is correct when authorising a transaction of a high value compared to a transaction of a low value. The authentication action by entering their PIN is only one example of how this indication may be achieved. In other examples the authentication could be achieved by fingerprint recognition used subsequent to the user being satisfied with the verification image, iris scanning or some other biometric verification technique.

The wireless data interface 318 illustrated in FIG. 1 serves to communicate with the internet so as to perform the transaction being authenticated. Thus, if the transaction is an online purchase, then the data necessary to set up and complete this online purchase may be communicated via the wireless data interface 318.

Another example of the user input data which may be captured to control the form of the verification image generated is a still or a moving image data captured by the camera 320. This still or moving image data may be subject to a transformation specified by the secure data stored within the secure region 324 of the memory 310. The verification image will thus vary depending upon what the user points the camera 320 at when capturing the user input data. Furthermore, the secure data is required in order to apply the secret transformation to this image, such as rendering onto a secret three dimensional solid shape known only to the user.

It will be appreciated that the verification image generation may be computationally intensive, particularly when manipulating three dimensional images. Accordingly, the graphic processing unit 306 may be used to generate the verification image as the specialised hardware resource within the graphics processing unit 306 are more suited to this type of processing. In order to enhance security the graphics processing unit 306 may be configured to operate only in the secure domain prior to generation of the verification image. The verification image can thus be generated in the secure frame buffer 330 within the secure region 324 by the graphics processor unit 306 which is itself operating in the secure domain. The user input device, which may be one of the accelerometers 314, the key pad 316 or the camera 320, is configured to operate the secure domain prior to generation of the verification image. This helps to resist unauthorised reading of the user input data by a potentially malicious program operating in the non-secure domain.

Figure 2:
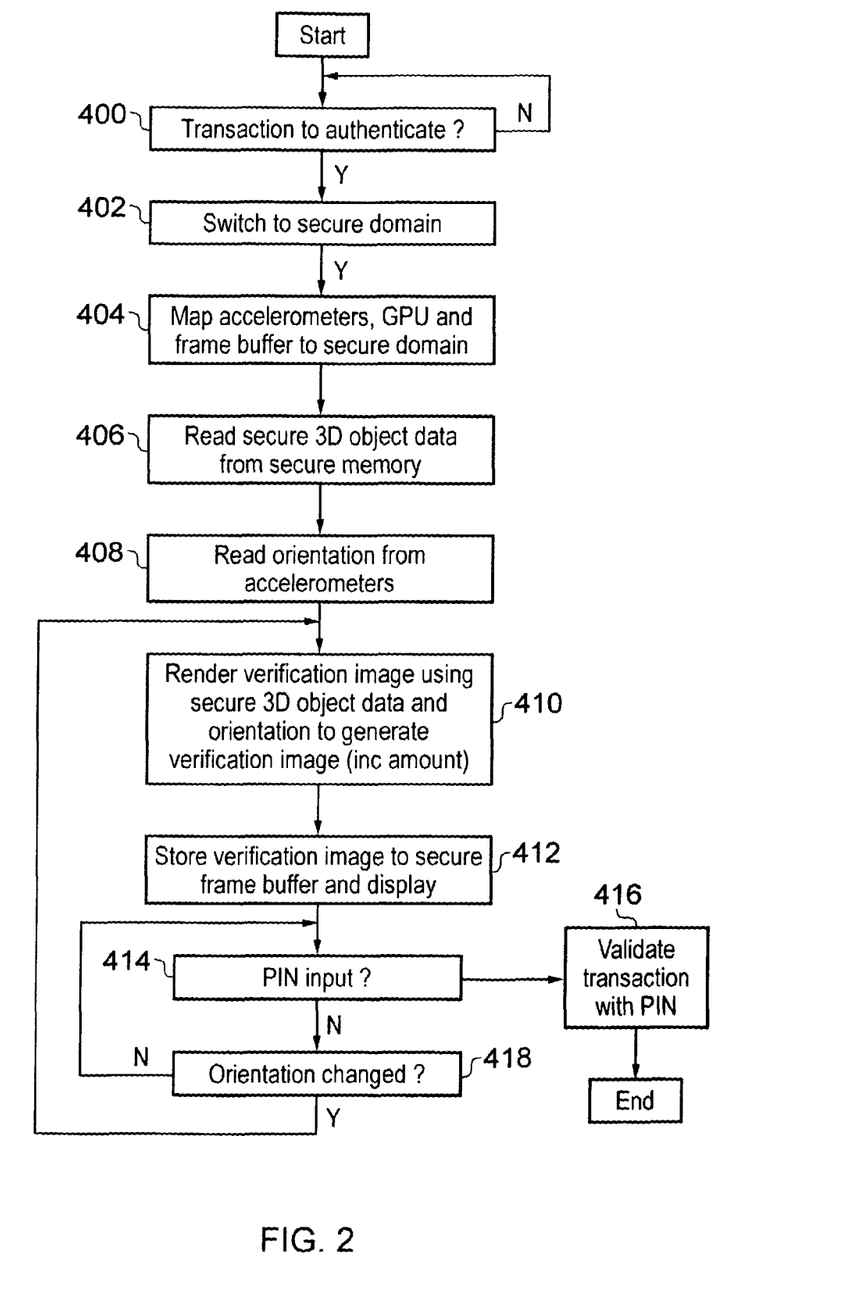
FIG. 2 is a flow diagram schematically illustrating the operation of the handheld device of FIG. 1.

FIG. 2 is a flow diagram schematically illustrating the operation of the hand held device 300 in generating a verification image. At step 400 processing waits until it is determined that there is a transaction to authenticate. At step 402 a switch is made to the secure domain. At step 404 the accelerometer 314, the graphics processing unit 306 and the frame buffer 330 are switched to the secure domain. In the case of the frame buffer, this may involve switching to use the secure frame buffer 330 provided within the secure region 324.

At step 406 the secure data in the form of secure three-dimensional object data is read from the secure region 324. As an example, the secure three-dimensional object data may be data representing the three-dimensional form of a house or the three-dimensional form of an animal, such as a cat or dog. At step 408 the orientation of the handheld device 300 device is read from the accelerometers 314. This orientation defines a viewpoint from which an image representing the secure three-dimensional object to be generated. Step 410 renders the verification image using the secure three-dimensional object data and the orientation (and possibly some static offset stored in secure memory) to generate the verification image. This verification image also includes the amount of the transaction to be authenticated as well as an indication that the authentication action is the input of a PIN number. Step 412 stores the verification image to the secure frame buffer 330 and the verification image is then displayed on the display 312.

At step 414 a determination is made as to whether or not a PIN number has been input. If a PIN number has been input then at step 416 serves to validate the transaction with the input PIN number. This validation may either succeed or fail depending upon whether or not the correct PIN number is entered.

If the determination at step 414 is that a PIN number has not yet been entered, the step 418 determines whether or not the orientation of the handheld device 300 has changed as detected by the accelerometers 314. If no change has been detected, then no change is required in the verification image being displayed. However, if the orientation of the handheld device 300 has changed, then a new viewpoint of the secure three-dimensional object data is required and processing returns to step 410 for generation of a verification image based upon this new view point to be generated.

Figure 3:
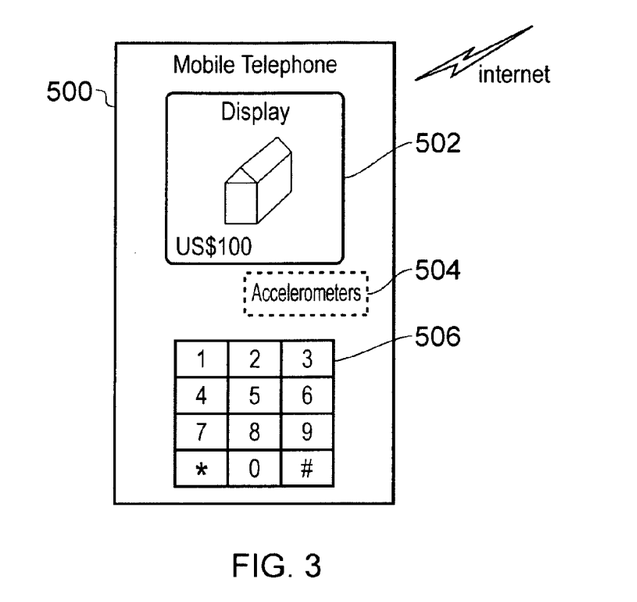
FIG. 3 illustrates one example embodiment of a mobile device displaying a verification image based upon secure image data representing a three-dimensional object viewed from a viewpoint dependant upon user input data received from accelerometers within the mobile telephone.

FIG. 3 illustrates an example of the handheld device 300 in the form of a mobile telephone 500. This mobile telephone includes a display 502 for displaying the verification image. The mobile telephone 500 further includes accelerometers 504 for detecting the orientation of the mobile phone 500 and a keypad 506b for entering numeric or character data as well as PIN numbers and other authentication data.

Figure 4:
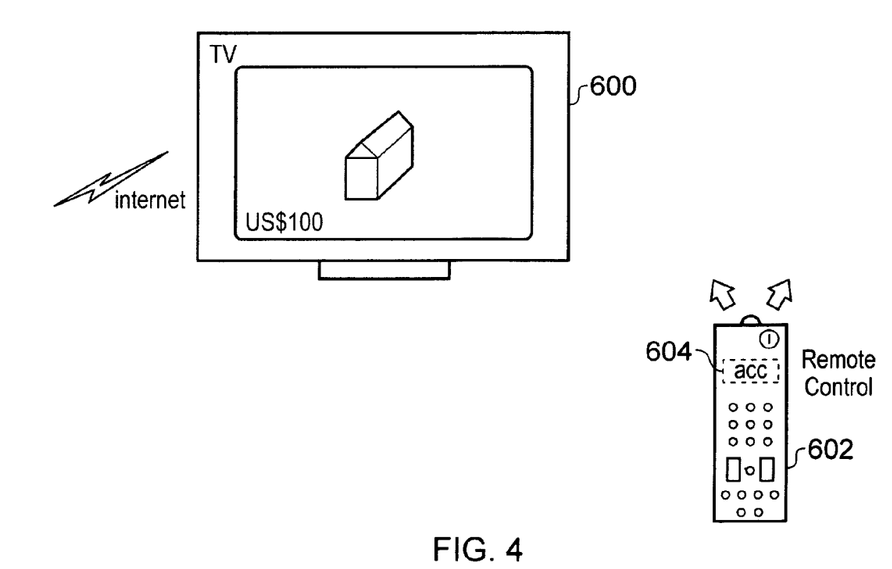
FIG. 4 illustrates an embodiment of a television displaying a verification image and the user input data being captured in a remote control for a television.

FIG. 4 illustrates another example use of the present techniques. In this example a television 600 displays the verification image. This television 600 is connected to the interne and is able to process transactions which require verification. The user input device is in the form of a remote control 602 used to normally control the operation of the television 600. This remote control includes accelerometers 604 which serve to provide user input data for defining a viewpoint of the verification image displayed by the television 600. The remote control 602 can communicate via radio or infrared signals with television 600 in the normal way.

Figure 5:
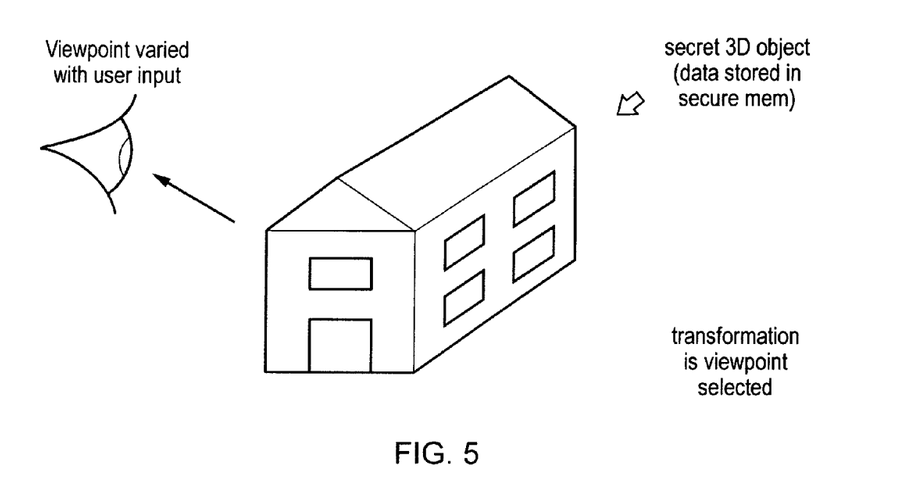
FIG. 5 schematically illustrates the verification image being generated from a secret three-dimensional object viewed from a viewpoint varied independence upon user input data.

FIG. 5 illustrates an example of how the viewpoint (orientation to and/or distance from) of a three-dimensional object may be varied depending upon user input so as to generate a verification image defined by a combination of the secret three-dimensional object data secured in the secure region 324 together with the captured orientation of the device which is varied in real time by the user manipulating the handheld device 300. The changes in orientation (i.e. the different secure transforms applied) giving rise to changes in viewpoint of the secret three-dimensional object will likely vary considerably between different instances when the verification images are being generated. This makes it difficult for a malicious person to simulate the verification images as they will not know in advance the sequence of changes in orientation that the user is likely to command.

Figure 6:
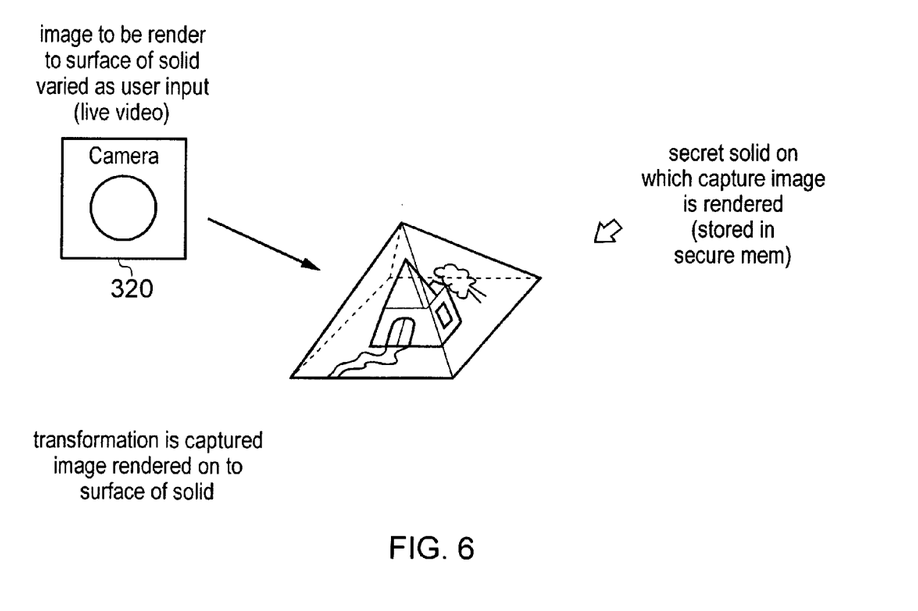
FIG. 6 schematically illustrates a verification image being generated based upon a secret three-dimensional solid with the user input data being captured image data and the verification image being formed by rendering the captured image data onto to the surface of the secret solid.

FIG. 6 illustrates another example of secure data and user input data. In this example the user input data is an image captured from the camera 320. This may be a still image or a moving image. This image is securely transformed by being rendered onto the surface of a solid shape defined by the secure data known only to the proper user and stored within the secure region 324. A user may define their own solid shape, such as a tetrahedron, a pyramid (as illustrated), a sphere, an ellipsoid or a combination of solid shapes such as sphere, a cube and a cylinder stacked together.

Figure 7:
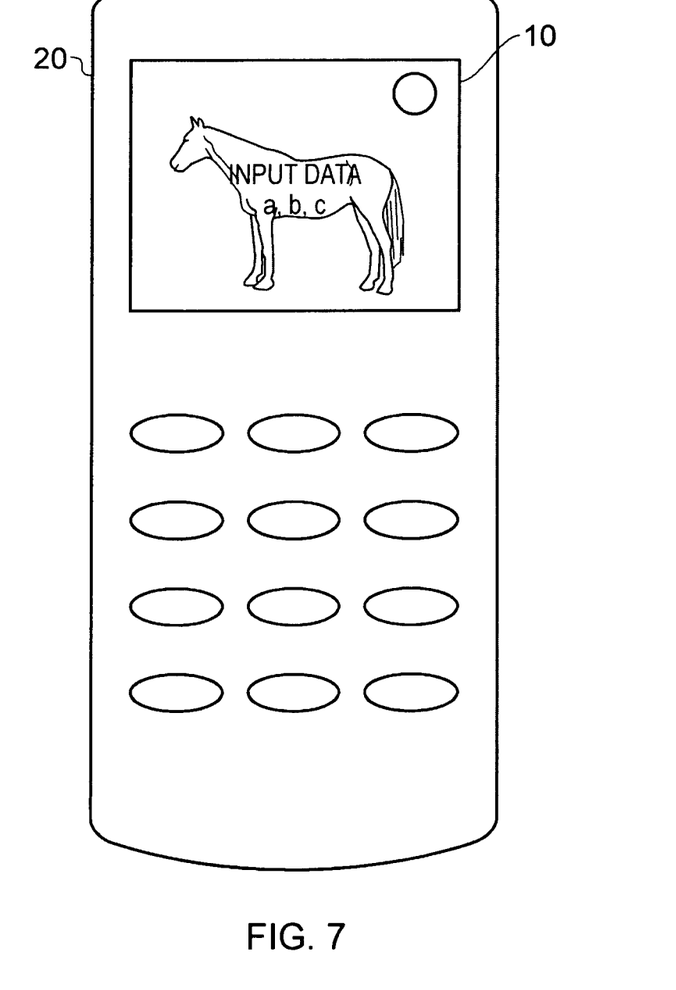
FIG. 7 schematically illustrates a display screen of a mobile telephone operating in a secure mode.

FIG. 7 shows a mobile phone 20 having a screen 10. In the Figure, the screen has a picture of a horse as a background image to the screen. This picture indicates to the owner of the phone that secure mode is in operation and that any data he sends or receives is safe from unauthorised access. The picture that is shown is specific to the user/owner of the phone and may be a photo taken by the phone owner with the phone camera and as such is unique to the owner of the phone and is easily recognisable by them. The picture may also be some other picture generated by the user and specific to him. The advantage of using a picture that is specific to the user and is stored in a secure domain is that pictures are hard to imitate and the user can recognise immediately his picture and be reassured that the secure domain is in operation. Generally, a phone belongs to an individual and as such the phone stores a single picture for indicating a secure domain. However, in some embodiments, it may be appropriate for a plurality of pictures specific to a plurality of users to be stored. In such circumstances, the phone would identify the user and display the appropriate picture as an indication of secure domain operation. In some embodiments, rather than a single photo taken by the user, a video clip specific to the user may be used.

Figure 8:
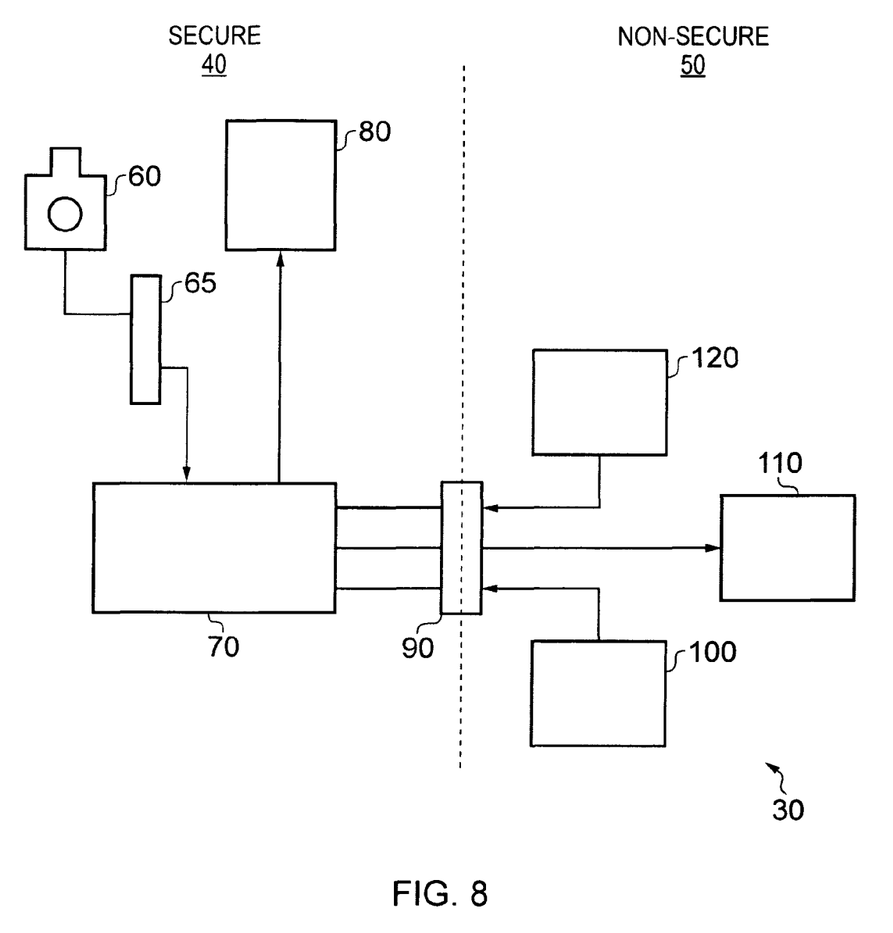
FIG. 8 schematically illustrates a data processing apparatus with a camera.

FIG. 8 shows a data processing apparatus 30 having a secure domain 40 and a non-secure domain 50. The data processing apparatus comprises a camera 60 within the secure domain 40. The camera 60 has hardware 65 associated with it and a software driver 70. All of these are located within the secure domain. There is also a secure memory 80 within the secure domain.

An interface 90 allows controlled communication between the non-secure domain 50 and the secure domain 40. The non-secure domain has a photographic application 100 operable to request the camera to take general non-secure photos. Instructions from the application 100 are routed through interface 90 and any photos taken in response to these instructions are sent back via interface 90 and are stored in non-secure memory 110.

The non-secure domain also comprises a separate software section 120 operable to initiate taking of a secure picture. In response to a command to initiate taking of this secure picture from section 120, the interface 90 routes the instruction to the software camera driver. This controls camera 60 to take a picture, which is then stored within a secure memory 80. Thus, a photo can be taken by camera 60 and stored within secure memory 80 without the picture ever being accessible to the non secure domain. This picture can then be used as background to the display to indicate operation within the secure domain. Thus, a picture that provides an indication of operation within the secure domain, that has been generated and stored within the secure domain and is never accessible to the non secure domain of the processor can be produced. This means that access to this picture by an unauthorised third party is avoided or at least inhibited.

Figure 9:
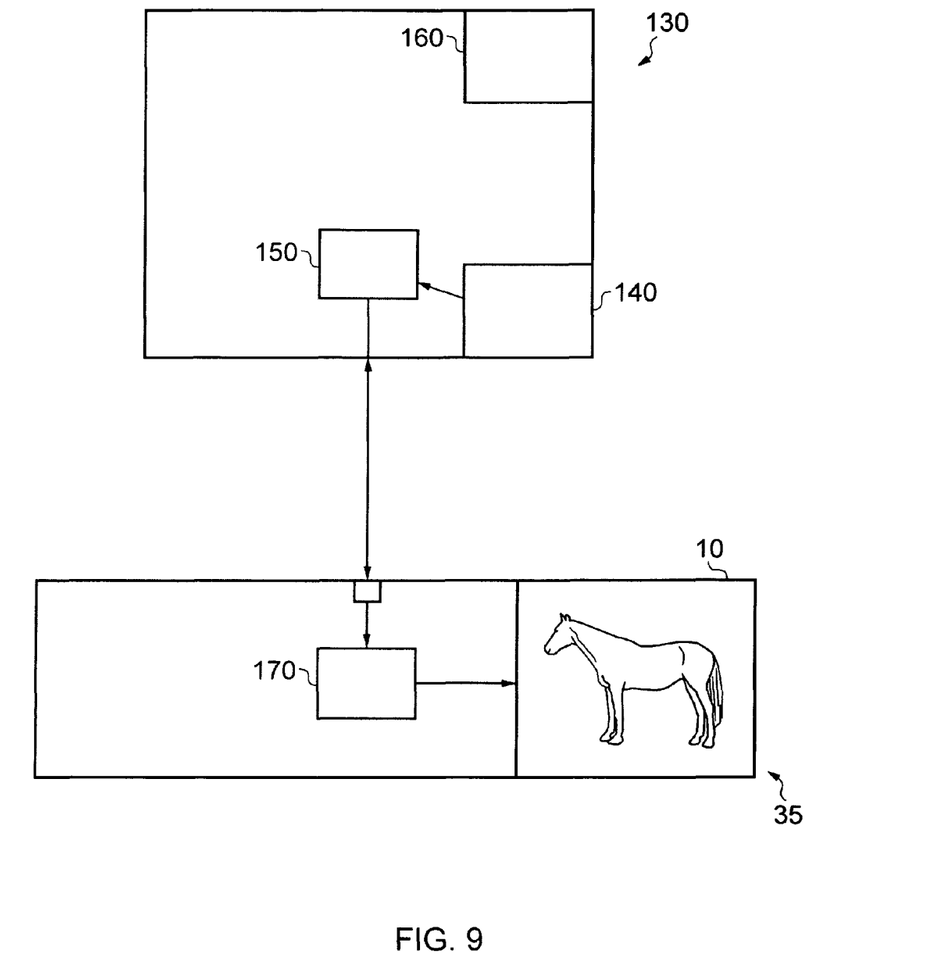
FIG. 9 schematically shows a personal computer in communication with a remote server.

FIG. 9 shows a server 130, having a data storage area 140 and encryption logic 150. The server 130 is operable to store user specific image data in data storage area 140. Each image has information associated with it identifying the user that it belongs to. This may be information relating to an actual individual user or it may relate to a code identifying a device such as a phone or a personal computer, where that device is generally used by a single individual. It may also be that a single user communicates with a particular server via a plurality of devices. The server would then identify that user in response to detection of any one of the plurality of devices and/or possibly further identifying data if one of the device were used by a plurality of users and would display the image specific to that user. In such a situation the user specific image might be a photo taken by one of the devices. When a remote data processing device 35 such as a personal computer contacts the server 130, the server identifies the user and/or device, finds the user specific image stored in memory 140 encrypts it and sends it to the device 35. Device 35 can then decrypt the image using decryption logic 170 and display the decrypted image as a background image on screen 10.

The server of FIG. 9 also, has image generation logic 160. This image generation logic comprises a store of images and logic operable to cut, paste and superimpose portions of the stored images onto each other to form a new image. In some situations the image generation logic is able to produce dynamic images consisting of a plurality of user generated images shown in a sequence, such as an animation sequence. Thus, a user of remote device 35 can contact the server and can use the image generation logic to generate an image specific to that user. The image can then be stored in memory 140 for retrieval by the server to send to the remote processing device. Memory 140 can also store user specific images generated in some other way and sent to the server, either from the remote data processing device 30 itself or by another remote device.

In other embodiments, the image generation logic 160 can be used to generate an image in conjunction with a remote processing device 35 and this image can then be transmitted to device 35 and stored locally within a secure memory in device 35. In these embodiments the server is not used to store the images, rather it is used to generate them and they are then stored locally on the remote device 35, for retrieval by this device when it is operating in its secure domain.

Figure 10:
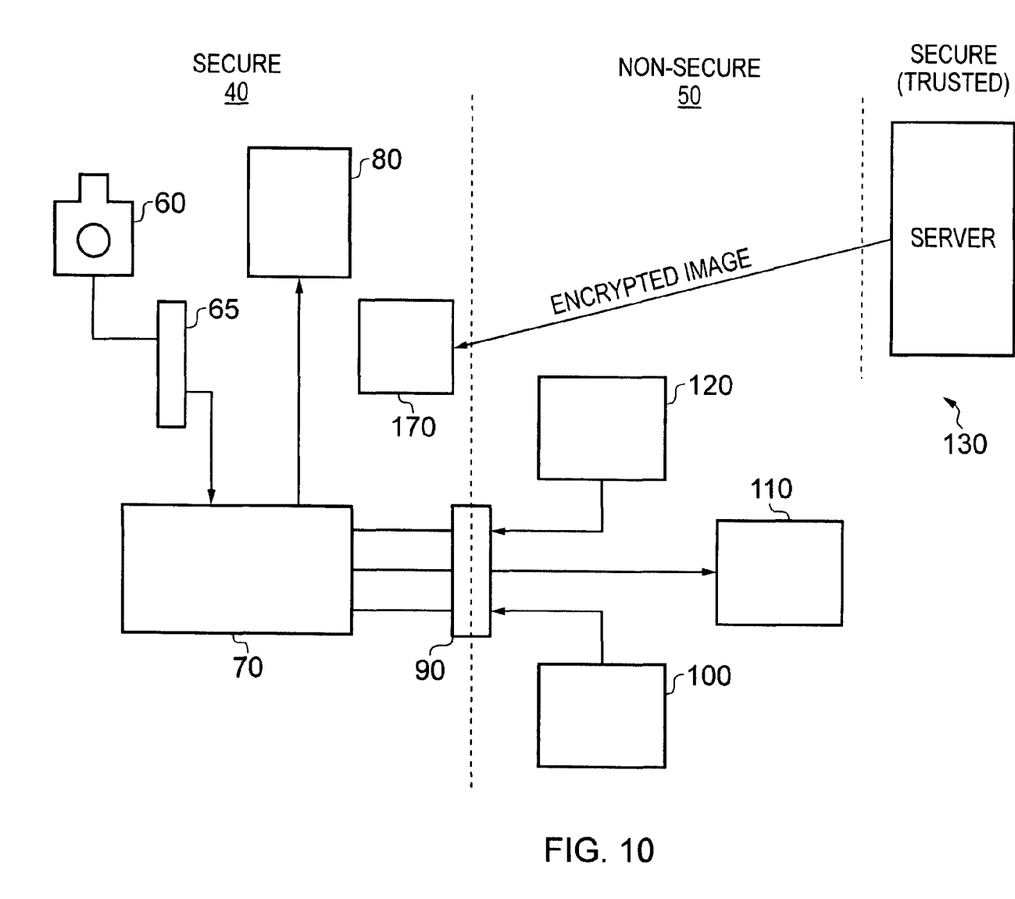
FIG. 10 schematically illustrates the data processing apparatus according to FIG. 8 communicating via a secure link with a server.

FIG. 10 shows a server 130 communicating with the data processing apparatus of FIG. 8. As can be seen the image passes through the non-secure portion of device 30 only in encrypted form and is received by decryption logic 170 located within the secure domain. Thus, although the image may be stored or generated remotely, it is not accessible except from within the secure domain of the data processing apparatus, from within the server, or in encrypted form. This is obviously only satisfactory if the server is a trustworthy server. In such a case the unencrypted image is only accessible from within the trustworthy server or from within the trustworthy secure domain of the data processing apparatus.

Figure 11:
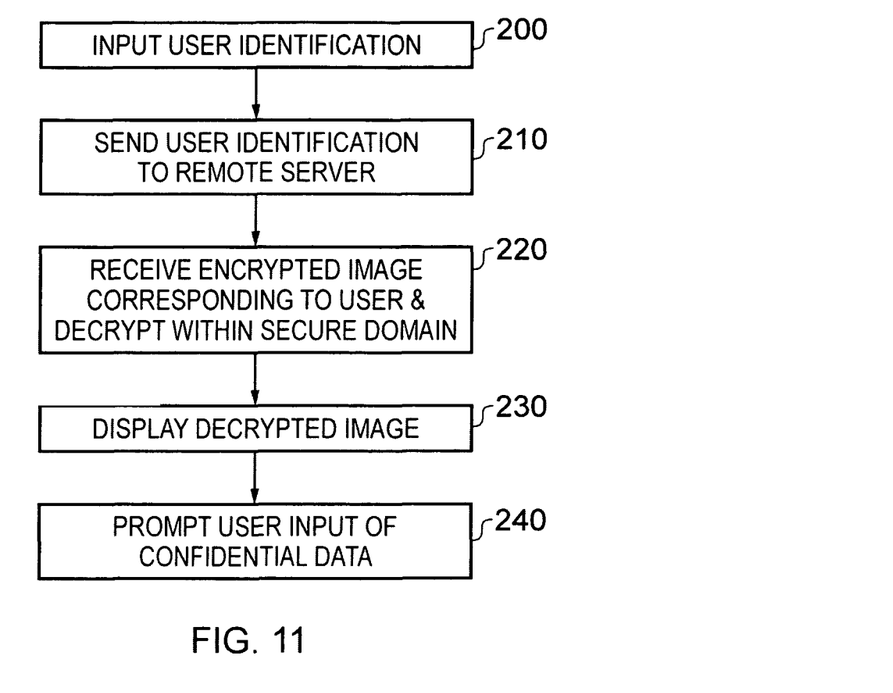
FIG. 11 is a flow diagram schematically illustrating how a data processing apparatus receives an image specific to a present user.
Figure 12:
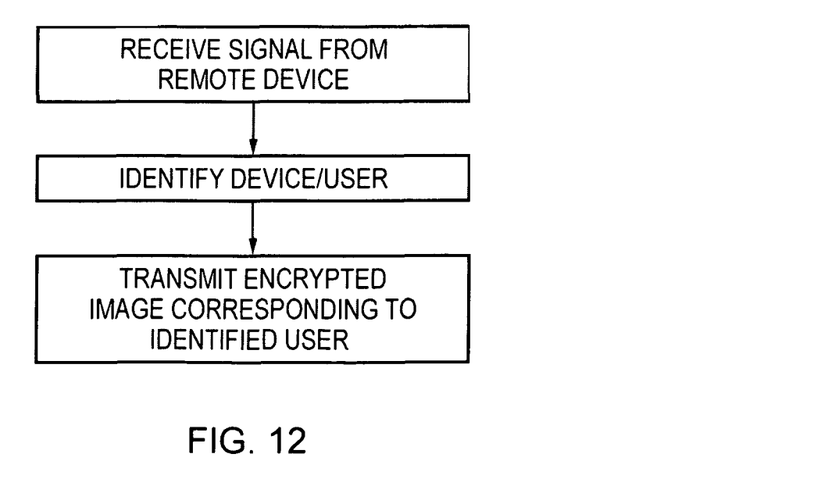
FIG. 12 is a flow diagram schematically illustrating how a server sends users specific images to a remote processor.

FIGS. 11 and 12 show flow diagrams indicating how information stored on a server, such as server 130 of FIG. 3 can be used to provide a secure user interface that a user can be confident is not an imitation. This could be used in circumstances such as with bank autotellers.

FIG. 11 shows actions occurring at the remote device such as at an auto teller at a bank. A user inputs their card 200 to the machine, and the machine sends information from the card identifying the user to the server 210. The machine then receives an encrypted image from the server and it decrypts this image within a secure domain, (in the case of a bank autoteller all of its operations are within a secure domain). The decrypted image is then displayed as a background and the user can be sure that the machine is a bona fide machine and has not been tampered with and can with safety input data such as their PIN code.

FIG. 12 shows the actions occurring at the server. The server receives a signal from a remote device. It identifies the device and/or the user from the signal and then it encrypts the stored image corresponding to that user/device and transmits it to the device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:

processing circuitry configured to operate in a selectable one of a secure domain and a non-secure domain;

a memory coupled to said processing circuitry and configured to store user defined secure image data, said user defined secure image data being accessible to said processing circuitry when operating in said secure domain and being non-accessible to said processing circuitry when operating in said non-secure domain;

a user input device coupled to said processing circuitry and configured to receive user input data;

a camera and camera driving software, said camera and camera driving software being arranged such that operation of said camera occurs within said secure domain, said user defined secure image data comprising a photo taken by said camera; and a display coupled to said processing circuitry and configured to display an image generated by said processing circuitry; wherein said processing circuitry is configured to operate in said secure domain to read (1) said user defined secure image data from said memory and (2) said user input data from said user input device;

said processing circuitry is configured to generate a verification image from both said user defined secure image data and said user input data by applying a secure transformation determined by said user input data to said user defined secure image data;

before said processing circuitry operates in said secure domain to generate said verification image, said user input device is configured such that said user input data cannot be read when said processing circuitry is operating in said non-secure domain; and said display is configured to display said verification image to a user to indicate that said processing circuitry is operating in said secure domain.

2. Apparatus as claimed in claim 1, wherein said secure data is secure image data that defines a three-dimensional object and said user input data defines a viewpoint, said processing circuitry configured to generate said verification image to correspond to said three-dimensional object viewed from said viewpoint.

3. Apparatus as claimed in claim 2, wherein said processing circuitry includes three-dimensional graphics accelerator circuitry configured to generate said verification image from said secure image data and said user input data.

4. Apparatus as claimed in claim 1, wherein said processing circuitry generates a sequence of verification images varying in dependence upon variation in said user input data read from said user input device during said generation of said sequence.

5. Apparatus as claimed in claim 1, wherein said user input device comprises accelerometer circuitry and said user input data indicates an orientation of said apparatus.

6. Apparatus as claimed in claim 1, wherein said user input device is a camera configured to capture image data and said secure data indicates a transformation to be applied to said image data to generate said verification image.

7. Apparatus as claimed in claim 1, wherein said user input device is integrally formed with said processing circuitry, said memory and said display.

8. Apparatus as claimed in claim 7, wherein said apparatus is a handheld device.

9. Apparatus as claimed in claim 1, wherein said processing circuitry is configured to receive while still operating in said secure domain a user password input by a user after display of said verification image, said user password being used by said processing circuitry to authenticate an action.

10. Apparatus as claimed in claim 9, wherein said verification image includes an action portion indicative of said action to be authenticated by said user password.

11. Apparatus as claimed in claim 10, wherein said action is a purchase transaction and said action portion is indicative of a value of said purchase transaction.

12. Apparatus as claimed in claim 1, wherein said secure data comprises a dynamic image comprising a plurality of images shown consecutively.

13. Apparatus as claimed in claim 12, wherein said dynamic image comprises a video clip.

14. Apparatus as claimed in claim 13, said apparatus further comprising a video camera and video camera driving software, said video camera and video camera driving software being arranged such that operation of said video camera occurs within said secure domain, said dynamic image comprising a video clip taken by said video camera.

15. Apparatus as claimed in claim 1, said apparatus configured to receive signals from, and send signals to, a remote server, said apparatus receiving said secure data from said remote server over a secure link.

16. Apparatus as claimed in claim 15, wherein said secure data comprises a user specific image fabricated by a user in conjunction with said remote server.

17. Apparatus as claimed in claim 16, wherein said user specific image comprises an image received over said secure link from said remote server where it is stored, said processor being operable to indicate operation within said secure domain and connection to said remote server by display of said image.

18. A data processing apparatus comprising:

processing means for operating in a selectable one of a secure domain and a non-secure domain;

memory means for storing user defined secure image data and coupled to said processing means, said user defined secure image data accessible to said processing means when operating in said secure domain and non-accessible to said processing means when operating in said non-secure domain;

user input means for receiving user input data and coupled to said processing means;

camera means and camera driving software means for taking a photo, said camera means and camera driving software means being arranged such that operation of said camera means occurs within said secure domain, said user defined secure image data comprising a photo taken by said camera means; and display means for displaying an image generated by said processing means; wherein said processing means is configured to operate in said secure domain to read (1) said user defined secure image data from said memory means and (2) said user input data from said user input means;

said processing means is configured to generate a verification image from both said user defined secure image data and said user input data by applying a secure transformation determined by said user input data to said user defined secure image data;

before said processing means operates in said secure domain to generate said verification image, said user input means is configured such that said user input data cannot be read when said processing means is operating in said non-secure domain; and said display means is configured to display said verification image to a user to indicate that said processing means is operating in said secure domain.

19. A method of indicating that processing circuitry is operating in a secure domain, said method comprising the steps of:

operating processing circuitry in a selectable one of a secure domain and a non-secure domain;

operating a camera and camera driving software in said secure domain to capture user defined secure image data comprising a photo taken by said camera;

storing said user defined secure image data, said user defined secure image data being accessible to said processing circuitry when operating in said secure domain and being non-accessible to said processing circuitry when operating in said non-secure domain;

receiving user input data;

when said processing circuitry is operating in said secure domain, reading (1) said user defined secure image data and (2) said user input data and generating a verification image from both said secure data and said user input data by applying a secure transformation determined by said user input data to said secure image data;

before said processing circuitry operates in said secure domain to generate said verification image, said user input data is made non-readable when said processing circuitry is operating in said non-secure domain; and displaying said verification image to a user to indicate that said processing circuitry is operating in said secure domain.

* * * * *